United States Patent Office 2,979,937
Patented Apr. 18, 1961

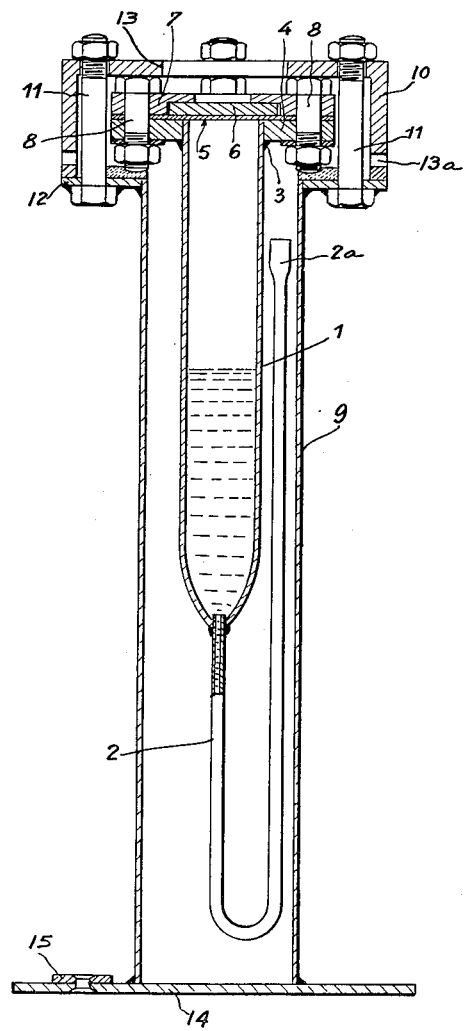

2,979,937
DEVICE PARTICULARLY FOR CALIBRATING EQUIPMENT FOR DETECTING LEAKS AND SIMILAR PURPOSES

André Chausson, Asnieres, France, assignor to Societe Anonyme des Usines Chausson, Asnieres, France, a French company Filed Jan. 2, 1957, Ser. No. 632,120
Claims priority, application France Jan. 3, 1956
5 Claims. (Cl. 73—1)

The present invention relates to a new calibrating device, intended to be used more particularly for calibrating equipment for locating leaks and especially slight leaks, that may occur in various apparatuses, containing volatile agents which, by escaping, run the risk of affecting the proper working of these apparatuses.

The calibrating of equipment for locating leaks has most frequently been carried out, up till now, by forming telltales in which a small quantity of a volatile product, such as methyl chloride, is mixed with a mass of oil of given volume. This mixture is then applied to the probe of the locating equipment to enable the signal obtained to be compared with that which is indicated by submitting the probe of this equipment to a circuit or an apparatus with a leak.

These liquid telltales, beside being inaccurate, have the serious disadvantage of not allowing an accurate measurement of the losses of a circuit to be made, but form merely a reference for roughly judging that a detecting apparatus is working. On the other hand, the device of the invention enables an absolute calibrating to be carried out, i.e., it becomes possible to measure a leak by making the comparison between the known leak of the device and the leak located.

According to the invention, the device is characterised by an enclosure closed by a plate of material made of a substantially impervious material but which permits a slight diffusion therethrough of a volatile agent contained in the enclosure. By the term slight diffusion, a rate of diffusion in the order of grammes per year is meant.

Various other characteristics of the invention will moreover be revealed by the detailed description which follows.

One form of embodiment of the invention is shown, by way of non-restrictive example, in the attached drawing.

The single figure is a longitudinal elevation section illustrating a form of embodiment of the device according to the invention.

The device shown in the drawing comprises a container 1 tubular in shape, whose bottom part is contracted.

2 designates a capillary tube emerging into the inside of the container 1, this tube having, for example, the shape shown in the drawing, so that it does not take up much space.

At its top part, the container 1 which is open, is connected, by means of solderings 3 for example, to a collar 4.

The container 1 is intended to hold a volatile product, such as Freon 12, methyl chloride, or any other volatile product whose aptitude for traversing a given wall is desired to be ascertained.

The volatile product is placed in the container 1, after which the latter is closed, as mentioned hereinafter, by means of a capillary tube 2, which has been previously utilised for producing a vacuum inside this container.

When the volatile product has been put into the container 1, the capillary tube 2 is flattened at 2a, then soldered, so that there is no risk of a leak at that point.

The container 1 is closed in the following manner:

A plate or diaphragm 5 in the shape of a disc is placed on the collar 4, then a patch 6 of sintered bronze, for example, is placed on top of the plate 5 which is screwed down on to the collar 4 by means of a perforated cap 7, traversed, similar to the plate 5 and the collar 4, by retaining screws 8.

The plate 5 is made of a material whose diffusion characteristics, with regard to the volatile product contained in the container 1, are known.

By way of example, for making the plate 5, it is possible to use a synthetic rubber, such as that known as "Perbunan."

The patch 6 of sintered material is intended solely to prevent the distortion and bursting of the plate 5 under the action of the pressure of the volatile product contained in the container 1.

This patch of sintered material makes no difference to the delivery through the plate 5 owing to its porosity being considerable with regard to the diffusion of said plate 5.

So that the device, described above by way of example, runs no risk of becoming damaged under the action of impacts, it is advantageously enclosed in a casing 9, which may be cylindrical, which is closed at its top by a hood 10 secured by means of screws and nuts 11 on to an annular rim 12 made by the casing.

The top part of the hood 10 is advantageously provided with an opening 13 whose dimensions are selected so as to facilitate the insertion of the end of the probe of a leak detecting apparatus. Holes 13a are also advantageously drilled in the skirt of the hood for preventing an accumulation of volatile agent occurring inside the hood.

The base of the casing 9 is supported by a soleplate 14, provided, on its top, with an identification plate 15 for showing the particular characteristics of the gauge described above.

In actual practice, when the apparatus has received its charge of volatile product, it is allowed to stand during several hundred hours, so that the imbibition of the plate with slight porosity 5 takes place completely, after which, the device is calibrated while considering that it has reached an equilibrium position for which the quantity of volatile agent traversing the plate 5 is constant in time.

When this equilibrium position has been reached, the apparatus is weighed, then allowed to stand again in an enclosure whose internal temperature is constant.

The apparatus is weighed again after a given lapse of time, which enables the quantity of volatile agent that has passed through the plate 5, to be ascertained.

In this manner, it is possible to determine the quantity of volatile agent that is capable of escaping, in grammes per year, for example.

This quantity is obviously a function of the thickness of the plate 5, its nature and its surface.

It is also imperative to state that the diffusion through the plate 5 is also a function of the temperature, this diffusion varying appreciably according to an exponential law.

Consequently, it is necessary to utilize a correction coefficient for reckoning the amount of a leak when the device is used for regulating detecting devices placed in surroundings whose temperature is different to the temperature in which said device has itself been calibrated.

In actual practice, for variations of 10° plus or minus in comparison to the calibrating temperature, the correction to be applied is about a few hundredths per degree, when considering a device made in the manner mentioned above, this percentage obviously varying in function of the nature of the diaphragm and the volatile agent in question.

As will be easily perceived, the regulating of devices for locating leaks can be easily carried out, seeing that the modulation of the signals transmitted by these appliances varies in function of the importance of the leaks that they detect.

It is thus possible to utilize the detecting device, by placing its probe in front of the patch 6, which produces a reference modulation in the detecting equipment. It is then known that the variations of modulation indicate leaks whose importance, in relation to that determined by the device, vary in the same manner as this modulation.

The invention is not restricted to the example of embodiment shown and described in detail, for various modifications can be applied to it without going outside of its scope.

I claim:

1. A calibrating device for leak detector apparatus comprising a container of completely impervious material, said container having at least one opening, a volatile agent partially filling said container, and a closing member for said opening, said closing member being made of a substantially impervious material but which permits a slight diffusion therethrough of said volatile agent contained in said container.

2. A calibrating device for leak detector apparatus comprising an outer casing, a tubular container mounted within said outer casing, said container having an upper opening located within said outer casing, a volatile liquid partially filling said container, a diaphragm made of a substantially impervious material but which permits a slight diffusion therethrough of said volatile liquid contained in said container closing said opening in the container, a protecting plate of porous sintered material overlapping said diaphragm, and a perforated cover connecting said diaphragm and said plate with the container.

3. A calibrating device as set forth in claim 2, comprising further a filling duct communicating with said container.

4. A calibrating device for leak detector apparatus comprising a tubular container, said container having an upper opening, a volatile liquid partially filling said container, a diaphragm made of a substantially impervious material but which permits a slight diffusion therethrough of said volatile liquid contained in said container closing said opening in the container, a protecting plate of porous sintered material overlapping said diaphragm, and a perforated cover connecting said diaphragm and said plate with the container.

5. A calibrating device as set forth in claim 4, comprising further a filling duct communicating with said container.

References Cited in the file of this patent

UNITED STATES PATENTS

| | | |
|---|---|---|
| 1,014,842 | Muckenfuss | Jan. 16, 1912 |
| 1,391,041 | Boon | Sept. 20, 1921 |
| 2,239,628 | Seki | Apr. 22, 1941 |

OTHER REFERENCES

"Veeco Mass Spectrometer Leak Detector Model MS–5A," a publication of Vacuum-Electronic Engineering Co., 86 Denton Ave., New Hyde Park, New York, Bulletin (10 pp. only the back cover page is pertinent). (Copy in Division 36.)